United States Patent
Barthle

(10) Patent No.: US 10,327,419 B2
(45) Date of Patent: Jun. 25, 2019

(54) CLEANING APPARATUS FOR AN ARTICLE

(71) Applicant: Irma Cristina Barthle, Aurora, CO (US)

(72) Inventor: Irma Cristina Barthle, Aurora, CO (US)

(*) Notice: Subject to any disclaimer, the term of this patent is extended or adjusted under 35 U.S.C. 154(b) by 77 days.

(21) Appl. No.: 15/788,794

(22) Filed: Oct. 19, 2017

(65) Prior Publication Data
US 2018/0255747 A1     Sep. 13, 2018

Related U.S. Application Data

(60) Provisional application No. 62/470,816, filed on Mar. 13, 2017.

(51) Int. Cl.

| | | |
|---|---|---|
| A01K 13/00 | (2006.01) | |
| B08B 3/04 | (2006.01) | |
| B08B 1/00 | (2006.01) | |
| A46B 13/02 | (2006.01) | |
| B08B 1/04 | (2006.01) | |
| A46B 13/00 | (2006.01) | |

(52) U.S. Cl.
CPC .......... *A01K 13/001* (2013.01); *A46B 13/008* (2013.01); *A46B 13/02* (2013.01); *A46B 13/023* (2013.01); *A46B 13/026* (2013.01); *B08B 1/00* (2013.01); *B08B 1/002* (2013.01); *B08B 1/04* (2013.01); *B08B 3/04* (2013.01); *A46B 2200/1093* (2013.01)

(58) Field of Classification Search
CPC ................ A01K 13/001; A01K 13/004; A46B 2200/3073; A46B 9/02; A46B 11/00; B08B 1/00

USPC ..... 119/673, 651, 664, 600, 652; 15/104.92, 15/160, 21.1, 104.94, 161
See application file for complete search history.

(56) References Cited

U.S. PATENT DOCUMENTS

| | | | | |
|---|---|---|---|---|
| 4,813,091 A | * | 3/1989 | Glasener | A46B 9/02 15/104.04 |
| 5,321,867 A | * | 6/1994 | Probst | A46B 9/02 15/160 |
| 5,782,206 A | * | 7/1998 | Markowitz | A01K 1/0107 119/165 |
| 5,794,301 A | * | 8/1998 | Hietala | B08B 1/00 15/104.92 |
| 5,878,460 A | * | 3/1999 | Bruce | A46B 9/02 15/160 |

(Continued)

*Primary Examiner* — Yvonne R Abbott-Lewis
(74) *Attorney, Agent, or Firm* — Roger A. Jackson

(57) ABSTRACT

A cleaning apparatus for an article and method of use are disclosed, wherein the apparatus includes a base and a surrounding sidewall about a longitudinal axis, the sidewall extending from the base forming an interior, the sidewall terminating in an open aperture having a scarfed outlet margin forming a plane, wherein the plane forms an acute angle with the longitudinal axis. Operationally the scarfed margin facilitates the interior being filled to a selected capacity with a liquid while the longitudinal axis also forms an acute angle with a surface. Further a cleaning surface is movably engaged to the base that has a structure to impart movement to the cleaning surface to clean the article that is immersed in a liquid within the interior while the longitudinal axis is at the acute angle with the surface to operationally facilitate ease of immersion and removal of the article from the interior.

15 Claims, 6 Drawing Sheets

(56) References Cited

U.S. PATENT DOCUMENTS

| | | | | |
|---|---|---|---|---|
| 6,065,431 | A * | 5/2000 | Davis | A01K 13/001 |
| | | | | 119/600 |
| 6,269,512 | B1 * | 8/2001 | Thomson | A46B 9/02 |
| | | | | 15/104.92 |
| 6,708,363 | B2 * | 3/2004 | Larsen | A61L 2/26 |
| | | | | 15/104.92 |
| 7,302,915 | B2 * | 12/2007 | Leary | A01K 13/001 |
| | | | | 119/600 |
| 8,371,247 | B2 * | 2/2013 | Fleming | A01K 13/001 |
| | | | | 119/652 |
| 9,326,485 | B2 * | 5/2016 | Plummer | A01J 7/04 |
| 9,414,570 | B2 * | 8/2016 | Surmeli | A01K 13/002 |
| D799,126 | S * | 10/2017 | Shamoon | D30/158 |
| 2002/0069472 | A1 * | 6/2002 | Glass | A63B 57/60 |
| | | | | 15/104.92 |
| 2002/0152568 | A1 * | 10/2002 | Dillinger | E04F 21/16 |
| | | | | 15/104.92 |
| 2005/0011467 | A1 * | 1/2005 | Mulich | A01K 13/001 |
| | | | | 119/651 |
| 2014/0165310 | A1 * | 6/2014 | Byrne | B08B 1/00 |
| | | | | 15/21.1 |
| 2016/0100551 | A1 * | 4/2016 | Hanneken | A01K 13/001 |
| | | | | 119/673 |

* cited by examiner

CLEANING APPARATUS FOR AN ARTICLE

RELATED PATENT APPLICATION

This application claims the benefit of U.S. provisional patent application Ser. No. 62/470,816 filed on Mar. 13, 2017 by Irma Cristina Barthle of Aurora, Colo., U.S.

FIELD OF THE INVENTION

The present invention generally relates to a cleaning apparatus for an article and more particularly a cleaning apparatus for an animal foot that can be portable, compact, and easy to use to accommodate the animal foot being inclined to make inserting and removing the animal foot easier from the cleaning apparatus.

DESCRIPTION OF THE RELATED ART

Animals (whether they are companion, pets, agriculture, or farm) can get dirty feet (paws and hoofs, and the like) from being outdoors (especially in inclement weather), litter boxes, and so on, wherein many animal owners want to prevent dirt from being tracked into their living area floor from the animal. Further, individuals who exhibit or show animals want to keep their animals feet clean. Current methods of cleaning an animal's feet are to use a cleaning towelette, an absorbent cleaning pad, or sprays and wipes. None of these methods really clean typically the crevasses between an animal's paw pads, outside of using a pan full of soapy water and a soft scrub brush of which can by trying for the animal to put up with this paw manipulating to clean it as many animal's their paw pads can be quite sensitive.

Looking in particular at the prior art in this area starting with U.S. Pat. No. 4,532,668 to Slonicki is for a foot scrubber with a soap dispenser that includes scrub brushes attached to the inside of an encompassing housing, wherein the brushes are static and the user manually moves their foot within the housing as against the scrub brushes with soap dispensed when pressure is applied to a manual squeeze apparatus.

Continuing in the prior art for foot scrubbing apparatus, looking at U.S. Pat. No. 4,617,917 to Miller disclosed is a foot hygiene device that includes a shoe slipper type shaped housing with also statically attached different length bristles disposed on the inside of the housing, wherein like Slonicki, the user manually moves their foot around inside of the housing for both cleaning and massage.

Further, in the prior art for foot scrubbing apparatus, looking at U.S. Pat. No. 6,662,398 to Thomson disclosed is a hands free foot scrubber that is essentially a bath mat with a raised foot pad having bristles that is over a flexible bladder that has a soap liquid contained within the bladder, thus as the user steps on the raised foot pad the bladder releases the soap liquid to the bristles, again for the user to manually move their foot against to bristles for foot cleaning.

Next, in the prior art for foot scrubbing is U.S. Pat. No. 6,893,508 to Andrews that discloses an apparatus for foot scrubbing having a pedestal with a rough surface pad and having vertical posts for scrubbing in-between the toes, further underneath the pad is a bladder with a soapy mixture that can manually pumped by the foot that is not being washed, wherein the other foot is manually rubbed on the pad for scrubbing.

Yet further, in the prior art for foot scrubbing in U.S. Pat. No. 6,389,631 to Keith discloses a foot scrubbing device that is constructed like a foot sandal with bristles on the inside and a soap reservoir in the sole portion of the sandal shape, wherein the sole of the sandal shape is adapted to removably engage the bottom surface of a bathtub.

What is needed is an animal specific paw cleaning apparatus that has the benefits of soaking the paw in soapy water while simultaneously soft brushing the paw, which being adapted to facilitate one-handed operation by the user to allow the user's other free hand to control the animal and further to allow the cleaning apparatus to tilt at about forty-five degrees to allow the animal's leg to insert into the cleaning apparatus without the animal being required to raise their leg too much, plus this makes the removal of the animal's leg from the cleaning apparatus easier.

SUMMARY OF INVENTION

Broadly, the present invention is of the cleaning apparatus for an article having a proximal end portion and an opposing distal end portion with a longwise axis spanning therebetween on the article, the cleaning apparatus itself including a base and a surrounding sidewall extending from the base, the sidewall being about a longitudinal axis, the sidewall having an interior surface and an opposing exterior surface, wherein the sidewall terminating in an open aperture having a scarfed outlet margin in relation to the base. The scarfed outlet margin structurally results in the sidewall having a maximum extension distance from the base and a peripherally opposing minimum extension distance from the base, wherein a remainder of the outlet margin has a varying extension distance from the base that is in-between the given minimum and maximum extension distances. The sidewall interior surface and the base defining a cleaning apparatus interior, wherein operationally the scarfed margin facilitates the interior being filled to a selected capacity with a liquid while the longitudinal axis forms a longitudinal axis acute angle with a surface.

Further included in the cleaning apparatus for an article is a cleaning surface that is movably engaged to the base, the cleaning surface including a plurality of flexible elements, each flexible element having a proximal end portion and an opposing distal end portion with an element length axis therebetween. Each element length axis is substantially parallel to one another, wherein the plurality of proximal end portions are affixed to one another forming a substructure and the plurality of distal end portions have free independent movement to one another in a cantilever manner. Also included in the cleaning apparatus for an article is a means for imparting movement to the substructure to cause movement at the plurality of flexible element distal end portions relative to the base and surrounding sidewall.

These and other objects of the present invention will become more readily appreciated and understood from a consideration of the following detailed description of the exemplary embodiments of the present invention.

REFERENCE NUMBERS IN DRAWINGS

Figure 1:
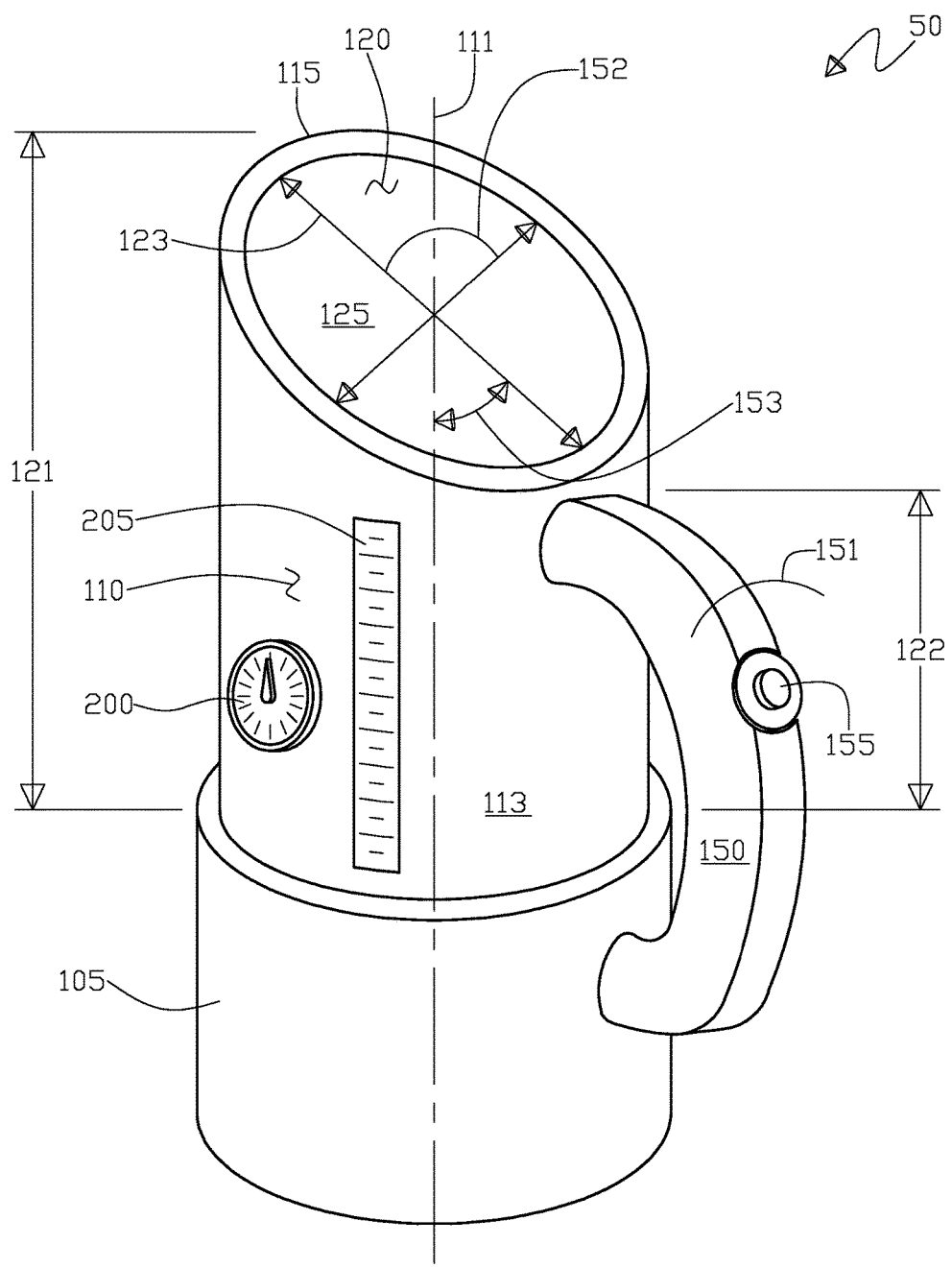
FIG. 1 shows an upper perspective view of the cleaning apparatus that includes a base, a surrounding sidewall that is about a longitudinal axis, a handle disposed upon the surrounding sidewall, in addition to an indicia index to show the level of a liquid within the surrounding sidewall, further shown is a temperature indicator disposed within the surrounding sidewall to give a temperature of the liquid, plus a scarfed outlet margin of the surrounding sidewall, wherein the scarfed outlet margin forms a plane that is at an acute angle with the longitudinal axis.

50 Cleaning apparatus for an article 175
105 Base of the cleaning apparatus 50
110 Surrounding sidewall of the cleaning apparatus 50
111 Longitudinal axis of the sidewall 110
112 Interior surface of the sidewall 110
113 Exterior surface of the sidewall 110
114 Surface
115 Scarfed outlet margin of the surrounding sidewall 110
120 Open aperture of the margin 115
121 Maximum extension distance of sidewall 110
122 Minimum extension distance of sidewall 110
123 Peripherally opposing as between the maximum extension distance 121 and the minimum extension distance 122
124 Acute angle from the longitudinal axis 111 to the surface 114
125 Interior of the base 105 and surrounding sidewall 110
130 Cleaning surface
131 Movable engagement of the cleaning surface 130 to the base 105
132 Plurality of flexible elements
133 Proximal end portion of the plurality of flexible elements 132
134 Distal end portion of the plurality of flexible elements 132
135 Movement of the cleaning surface 130
136 Element length axis of each one of the plurality of flexible elements 132
137 Parallel position of the element length axes 136 to one another
138 Affixment of the proximal end 133 each of the plurality of flexible elements 132 to the cleaning surface 130
139 Free cantilever movement of the distal end portion 134 of each one of the plurality of flexible element 132
140 Means for imparting movement 135 to the cleaning surface 130
141 Brush of the plurality of flexible elements 132
142 Free bristle ends of the distal end portion 134 of the plurality of flexible elements 132
143 Substructure of the cleaning surface 130
145 Motor of the means 140 for imparting movement 135 to the cleaning surface 130
146 "X" axis movement of the cleaning surface 130
147 "Y" axis movement of the cleaning surface 130
148 "Z" axis movement of the cleaning surface 130
149 Movement about the sidewall 110 longitudinal axis 111

150 Handle of the sidewall 110
151 Handle positioned at the minimum extension distance 122 of the sidewall 110
152 Scarfed plane
153 Acute angle of the scarfed plane 152 to the longitudinal axis 111 of the sidewall 110
155 On/off switch disposed on the handle 150
175 Article
180 Proximal end portion of the article 175
185 Distal end portion of the article 175
190 Longwise axis of the article 175
195 Light
200 Temperature indicator
205 Indicia liquid 250 level index
250 Liquid composition
255 Parallel distance relationship of the scarfed outlet margin 115 plane 152 to the surface 114

DETAILED DESCRIPTION

With initial reference to FIG. 1 shown is an upper perspective view of the cleaning apparatus 50 that includes the base 105, the surrounding sidewall 110 that is about the longitudinal axis 111, with the handle 150 disposed upon the surrounding sidewall 110 exterior surface 113, in addition to the indicia index 205 to show the level of the liquid 250 within the surrounding sidewall 110, further shown is the temperature indicator 200 disposed within the surrounding sidewall 110 to give a temperature of the liquid 250, plus the scarfed outlet margin 115 of the surrounding sidewall 110, wherein the scarfed outlet margin 115 forms a plane 152 that is at an acute angle 153 with the longitudinal axis 111.

Figure 2:
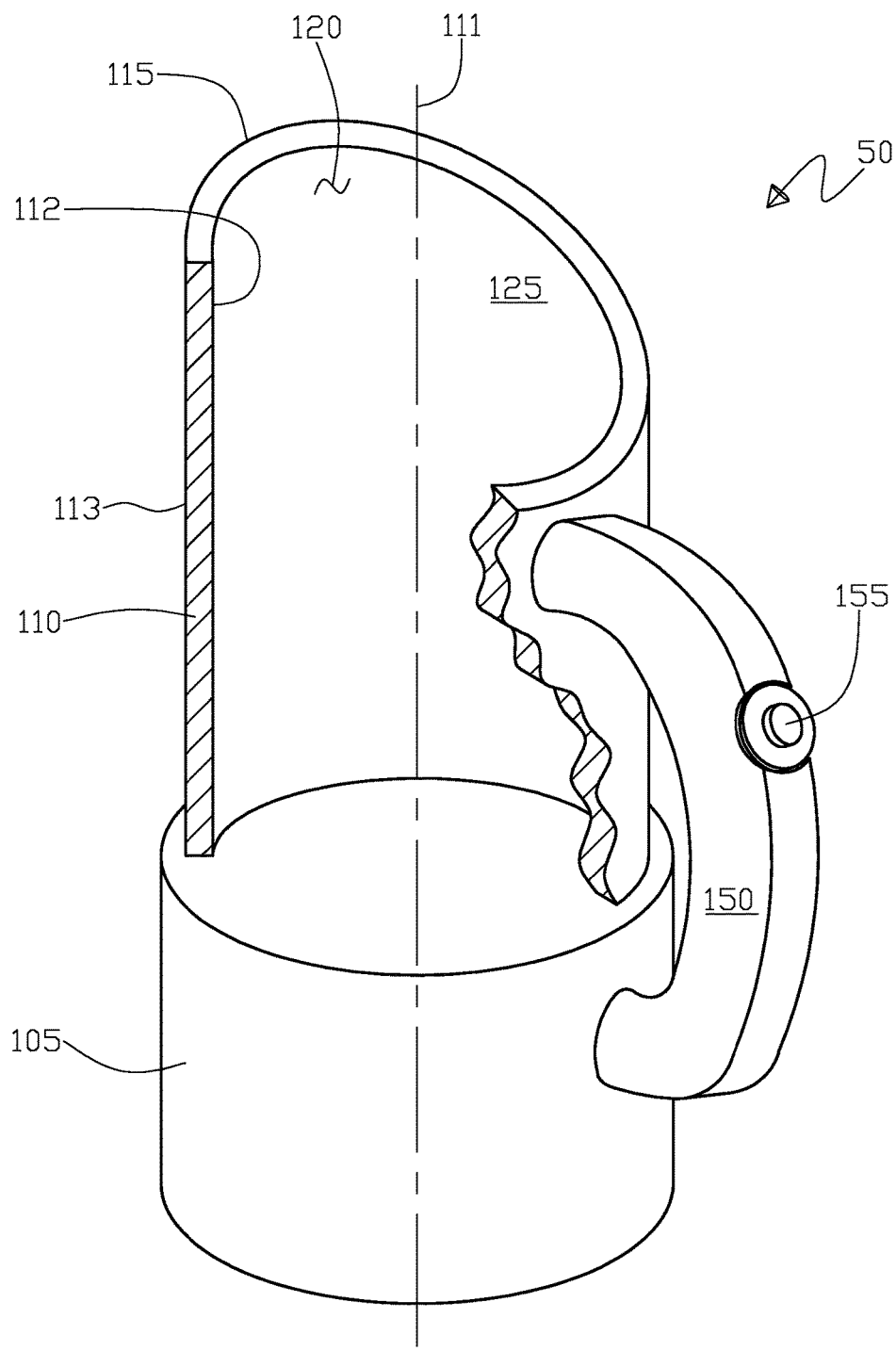
FIG. 2 shows a cutaway upper perspective view of the cleaning apparatus that includes the base, the surrounding sidewall that is about the longitudinal axis, the handle disposed upon the surrounding sidewall, wherein an interior of the surrounding sidewall is shown, further shown is an interior surface of the surrounding sidewall and an exterior surface of the surrounding sidewall.

Next, FIG. 2 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is an interior surface 112 of the surrounding sidewall 110, and the exterior surface 113 of the surrounding sidewall 110.

Figure 3:
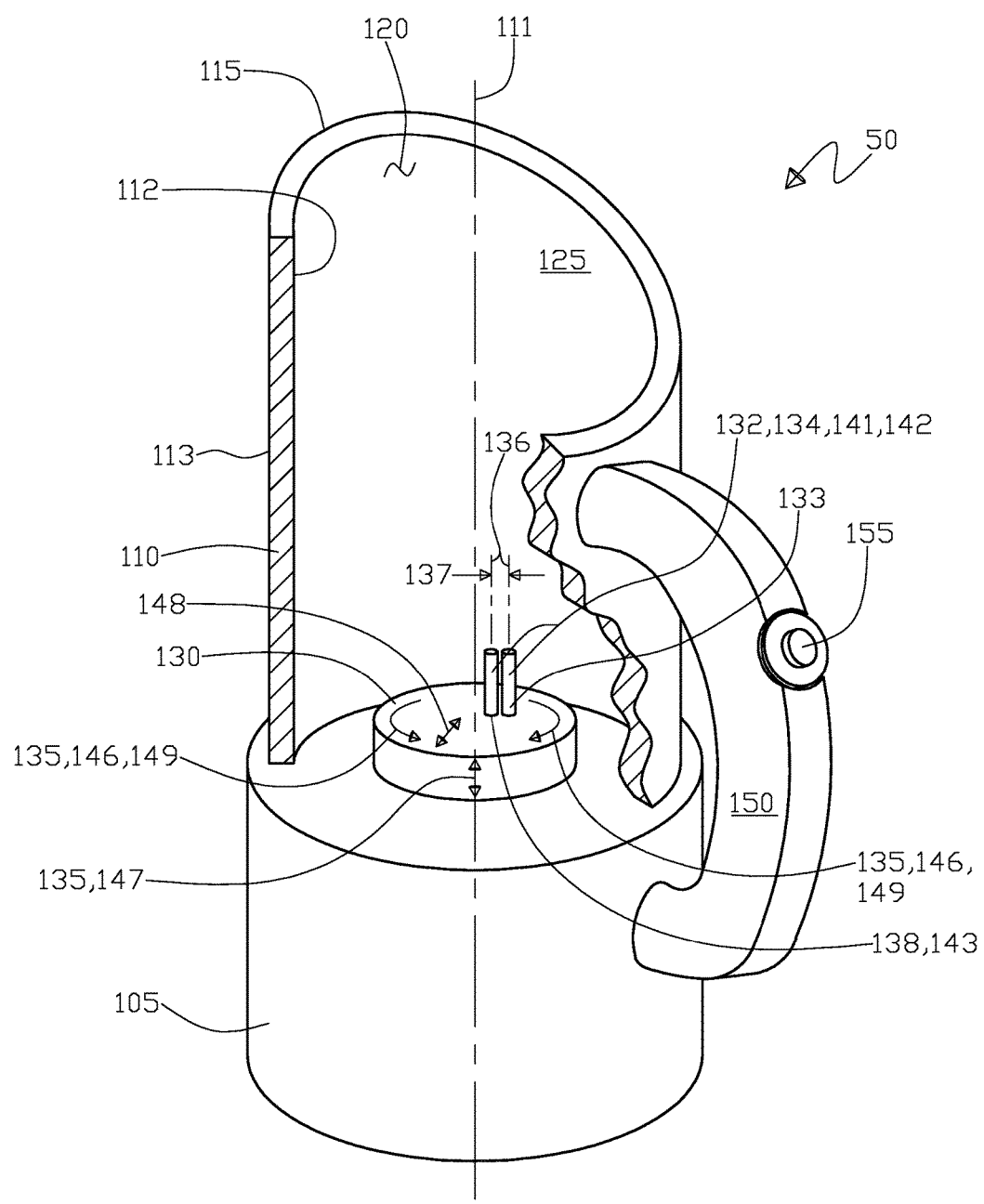
FIG. 3 shows a cutaway upper perspective view of the cleaning apparatus that includes the base, the surrounding sidewall that is about the longitudinal axis, the handle disposed upon the surrounding sidewall, wherein the interior of the surrounding sidewall is shown, further shown is the interior surface of the surrounding sidewall and the exterior surface of the surrounding sidewall, further shown is a cleaning surface that includes a plurality of flexible elements each having a proximal end portion and an opposing distal end portion, wherein each proximal end portion is affixed to the cleaning surface and each distal end portion has free cantilever movement, also the plurality of flexible elements can have movement in three axes relative to the base and surrounding sidewall.

Continuing, FIG. 3 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is the interior surface 112 of the surrounding sidewall 110 and the exterior surface 113 of the surrounding sidewall 110. Further shown in FIG. 3 is a cleaning surface 130 that includes a plurality of flexible elements 132 each having a proximal end portion 133 and an opposing distal end portion 134, wherein each proximal end portion 133 is affixed 138 to the cleaning surface 130 and each distal end portion 134 has free cantilever movement 139, also the plurality of flexible elements 132 can have movement in three axes 146, 147, 148 relative to the base 105 and surrounding sidewall 110.

Figure 4:
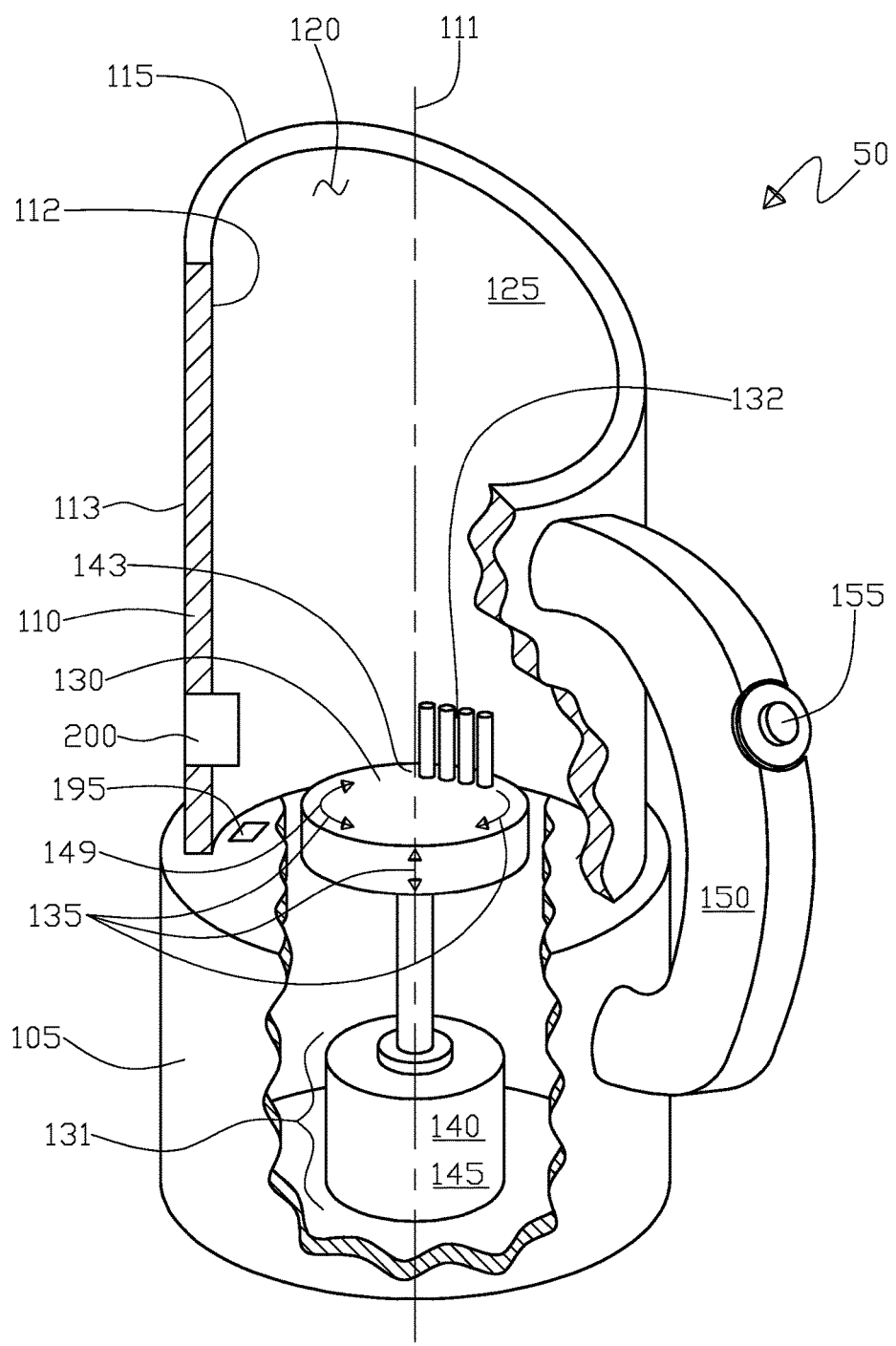
FIG. 4 shows a cutaway upper perspective view of the cleaning apparatus that includes the base, the surrounding sidewall that is about the longitudinal axis, the handle disposed upon the surrounding sidewall, wherein the interior of the surrounding sidewall is shown, further shown is the interior surface of the surrounding sidewall and the exterior surface of the surrounding sidewall, further shown is the cleaning surface that includes the plurality of flexible elements each having the proximal end portion and the opposing distal end portion, wherein each proximal end portion is affixed to the cleaning surface and each distal end portion has free cantilever movement, also the plurality of flexible elements can have movement in three axes relative to the base and surrounding sidewall all via a movable engagement of the cleaning surface to the base with a means for imparting movement to the cleaning surface shown as a motor, in addition in cross section shown therethrough the surrounding sidewall is the temperature indicator for indicating the temperature of the liquid that is disposed within the interior of the surrounding sidewall.

Yet, further FIG. 4 shows a cutaway upper perspective view of the cleaning apparatus 50 that includes the base 105, the surrounding sidewall 110 that is about the longitudinal axis 111, the handle 150 disposed upon the surrounding sidewall 110, wherein the interior 125 of the surrounding sidewall 110 is shown, further shown is the interior surface 112 of the surrounding sidewall 110 and the exterior surface 113 of the surrounding sidewall 110. Further shown in FIG. 4 is a cleaning surface 130 that includes the plurality of flexible elements 132 each having the proximal end portion 133 and the opposing distal end portion 134, wherein each proximal end portion 133 is affixed 138 to the cleaning surface 130 and each distal end portion 134 has free cantilever movement 139. Also shown in FIG. 4 is the plurality of flexible elements 132 that can have movement in three axes 146, 147, 148 relative to the base 105 and surrounding sidewall 110 all via a movable engagement 131 of the cleaning surface 130 to the base 105 with a means 140 for imparting movement 135 to the cleaning surface 130 preferably shown as a motor 145. In addition, in FIG. 4 shown in cross section therethrough the surrounding sidewall 110 is the temperature indicator 200 for indicating a temperature of the liquid 250 that is disposed within the interior 125 of the surrounding sidewall 110.

Figure 5:
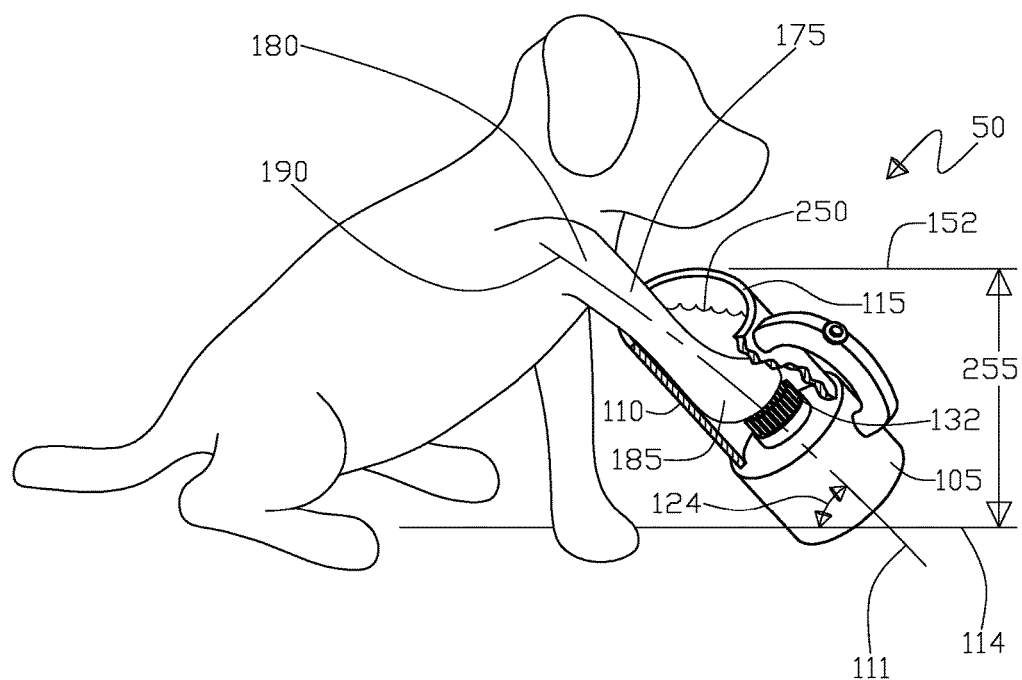
FIG. 5 shows a use perspective view showing the article in the form of a dog leg that has an article proximal end portion-being the dog leg shoulder and an article distal end portion-being the dog leg paw, wherein a portion of the dog leg and paw are inserted into the interior of the surrounding sidewall until the paw contacts the plurality of flexible elements while the portion of the dog leg and paw are immersed in the fluid composition for the operational purpose of cleaning the dog paw while holding the cleaning apparatus at an angle to the surface, such that the surrounding sidewall longitudinal axis forms an acute angle with the surface, wherein the scarfed outlet margin operationally facilitates that the scarfed outlet margin plane being substantially parallel to the surface making the dog paw and leg insertion and removal from the interior of the surrounding sidewall easier via lowering the scarfed outlet margin to be parallel and closer in distance to the surface while the article cleaning apparatus is being used, thus requiring the dog leg and paw to be lifted less distance from the surface to insert the portion of the dog leg and the paw into the surrounding sidewall interior.

Next, FIG. 5 shows a use perspective view, showing the article 175 in the form of a dog leg that has an article 175 proximal end portion 180—being the dog leg shoulder and an article 175 distal end portion 185—being the dog leg paw, wherein a portion of the dog leg and paw are inserted into the interior 125 of the surrounding sidewall 110 until the paw contacts the plurality of flexible elements 132 while the portion of the dog leg and paw are immersed in the fluid composition 250 for the operational purpose of cleaning the dog paw while holding the cleaning apparatus 50 at an angle to the surface 114. As FIG. 5 shows holding the cleaning apparatus 50 at an angle such that the surrounding sidewall 110 longitudinal axis 111 forms an acute angle 124 with the surface 114, wherein the scarfed outlet margin 115 operationally facilitates that the scarfed outlet margin 115 plane 152 being substantially parallel 255 to the surface 114 making the article 175 dog paw and leg insertion and removal from the interior 125 of the surrounding sidewall 110 easier via lowering the scarfed outlet margin 115 to be parallel 255 and closer in distance to the surface 114, while the article cleaning apparatus 50 is being used thus requiring the article 175 dog leg and paw to be lifted less distance 255 from the surface 114 to insert the portion of the article 175 dog leg and the paw into the surrounding sidewall 110 interior 125.

Figure 6:
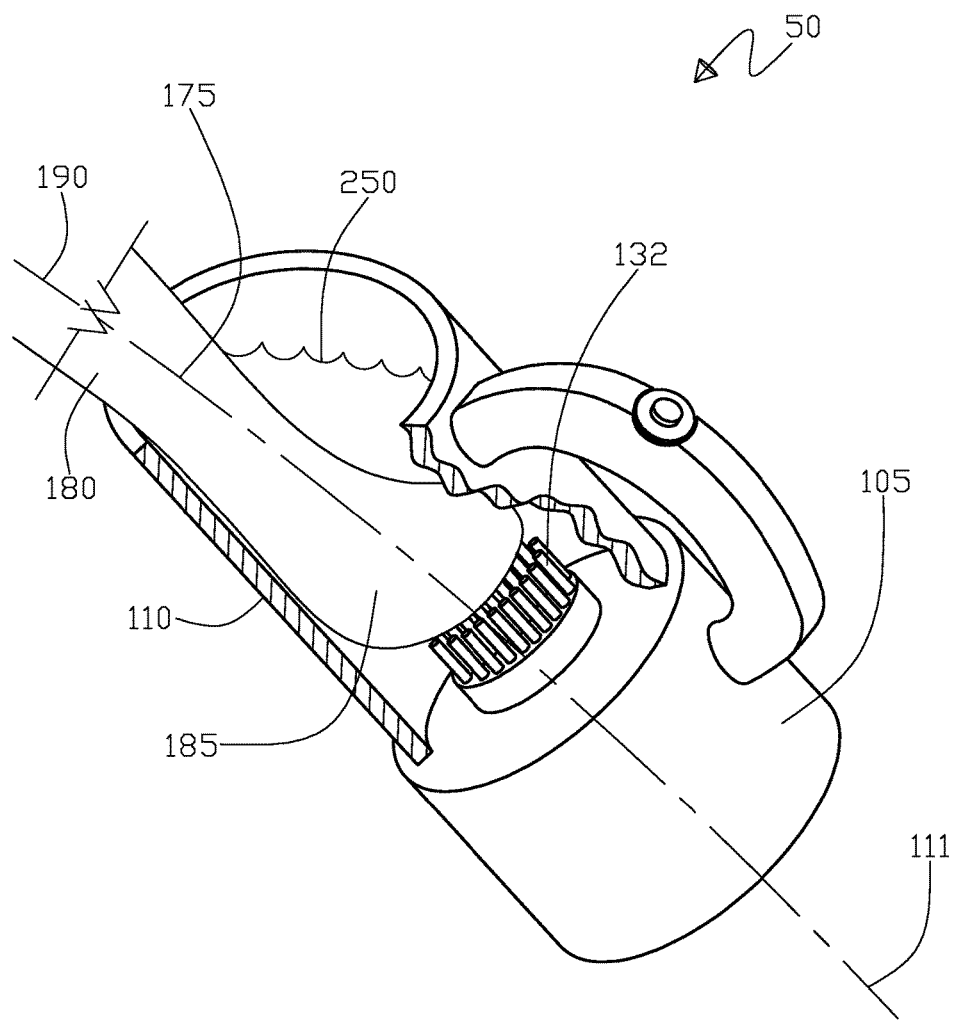
FIG. 6 shows a close up use perspective view of FIG. 5, with FIG. 6 showing the article in the form of the dog leg that has the article proximal end portion-being the dog leg shoulder and the article distal end portion-being the dog leg paw, wherein the portion of the dog leg and paw are inserted into the interior of the surrounding sidewall until the paw contacts the plurality of flexible elements while the portion of the dog leg and paw are immersed in the fluid composition for the operational purpose of cleaning the dog paw while holding the cleaning apparatus at the angle to the surface, such that the surrounding sidewall longitudinal axis forms the acute angle with the surface, wherein the scarfed outlet margin operationally facilitates that the scarfed outlet margin plane being substantially parallel to the surface making the dog paw and leg insertion and removal from the interior of the surrounding sidewall easier via lowering the scarfed outlet margin to be parallel and closer in distance to the surface while the article cleaning apparatus is being used thus requiring the dog leg and paw to be lifted less distance from the surface to insert the portion of the dog leg and the paw into the surrounding sidewall interior.

Continuing, FIG. 6 shows a close up use perspective view of FIG. 5, with FIG. 6 showing the article 175 in the form of the dog leg that has the article proximal end portion 180—being the dog leg shoulder and the article 175 distal end portion 185—being the dog leg paw, wherein the portion of the dog leg and paw are inserted into the interior 125 of the surrounding sidewall 110 until the paw contacts the plurality of flexible elements 132 while the portion of the dog leg and paw are immersed in the fluid composition 250 for the operational purpose of cleaning the dog paw while holding the cleaning apparatus 50 at an angle to the surface 114. Wherein FIG. 6 shows that the surrounding sidewall 110 longitudinal axis 111 forms an acute angle 124 with the surface 114 (shown in FIG. 5), wherein the scarfed outlet margin 115 operationally facilitates that the scarfed outlet margin 115 plane 152 being substantially parallel 255 to the surface 114 (shown in FIG. 5) making the dog paw and leg insertion and removal from the interior 125 of the surrounding sidewall 110 easier via lowering the scarfed outlet margin 115 to be parallel 255 and closer in distance to the surface 114 while the article cleaning apparatus 50 is being used thus requiring the dog leg and paw to be lifted less distance 255 from the surface 114 to insert the portion of the dog leg and the paw into the surrounding sidewall 110 interior 125.

Broadly, the present invention is of the cleaning apparatus 50 is for the article 175 having the proximal end portion 180 and the opposing distal end portion 185 with the longwise axis 190 spanning therebetween on the article 175, see FIGS. 5 and 6 in particular. The cleaning apparatus 50 including the base 105 and the surrounding sidewall 110 extending from the base 105, the sidewall 110 being about the longitudinal axis 111, the sidewall 110 having the interior surface 112 and the opposing exterior surface 113, wherein the sidewall 110 terminating in an open aperture 120 having the scarfed outlet margin 115 in relation to the base 105, see FIGS. 1 to 4. The scarfed outlet margin 115 structurally results in the sidewall 110 having a maximum extension distance 121 from the base 105 and a peripherally opposing 123 minimum extension distance 122 from the base 105, wherein a remainder of the outlet margin 115 has a varying extension distance from the base 105 that is in-between the given minimum 122 and maximum 121 extension distances, see FIG. 1 in particular plus FIGS. 2 to 5. The sidewall 110 interior surface 112 and the base 105 define a cleaning apparatus interior 125, wherein operationally the scarfed margin 115 facilitates the interior 125 being filled to a selected capacity with the liquid 250 (which is preferably a lukewarm soapy solution) while the longitudinal axis 111 forms the acute angle 124 with the surface 114, see FIG. 5 and also FIG. 1.

Further included in the cleaning apparatus 50 for an article 175 is the cleaning surface 130 that is movably engaged 131 to the base 105, is the cleaning surface 130 that includes the plurality of flexible elements 132, each flexible element 132 having the proximal end portion 133 and the opposing distal end portion 134 with an element length axis 136 therebetween, as best shown in FIGS. 3 and 4. Each element length axis 136 is substantially parallel 137 in position to one another, wherein the plurality of proximal end portions 133 are affixed 138 to one another forming a substructure 143 and the plurality of distal end portions 134 have free independent movement 139 to one another in a cantilever manner, again see FIGS. 3 and 4. Also included in the cleaning apparatus 50 for an article 175 is the means 140 for imparting movement 135 to the substructure 143 to cause movement 135 at the plurality of flexible element 132 distal end portions 134, again see FIGS. 3 and 4.

Optionally for the cleaning apparatus 50, wherein the cleaning surface 130 is preferably constructed of a brush 141 wherein the plurality of flexible element 132 distal end portions 134 are free bristle 142 ends 139 of the brush 141 that positionally face the scarfed outlet margin 115 and the substructure 143 is positionally facing the base 105, as best shown in FIGS. 3 and 4, plus FIGS. 5 and 6. Further, another option for the cleaning apparatus 50, wherein the means 140 for imparting movement 135 is preferably constructed of a motor 145 wherein the movement 135 is omnidirectional having movement 135 in a "X" 146, or "Y" 147, or "Z" 148 axes, as seen in FIGS. 3 and 4. Alternatively, also for the cleaning apparatus 50, wherein the means 140 for imparting movement 135 is preferably constructed of a motor 145 wherein the movement is omnidirectional having movement 135 in a "X" 146 and a "Y" 147 axes, again see FIGS. 3 and 4. Another alternative for the cleaning apparatus 50, wherein the means 140 for imparting movement 135 is preferably constructed of a motor 145 wherein the movement 135 is omnidirectional having movement 149 about the sidewall 110 longitudinal axis 111, see FIGS. 3 and 4.

Yet further, optionally for the cleaning apparatus 50, it can further comprise the handle 150 disposed on the sidewall 110 exterior surface 113 wherein the handle 150 is positioned 151 at the sidewall 110 minimum extension distance 122, as best shown in FIG. 1, plus FIGS. 2 to 5. Another option for the cleaning apparatus 50 is wherein the sidewall 110 is preferably constructed of transparent material such as a plastic, see all FIGS. 1 to 6.

A further option for the cleaning apparatus 50, being wherein the scarfed margin 115 forms the scarfed plane 152, wherein the scarfed plane 152 is at a plane acute angle 153 with the sidewall 110 longitudinal axis 111, as best shown in FIG. 1 and further shown in FIGS. 2 to 6. The preferred angle for the acute angle 153 is about forty-five degrees. As another option for the cleaning apparatus 50, is that it can further comprise a light 195 disposed within the sidewall 110 interior 125, as best shown in FIG. 4. Another option for the cleaning apparatus 50, is that it can further comprise the temperature indictor 200 disposed within the sidewall 110 interior to indicate the temperature of the liquid composition 250, see FIGS. 1 and 4. As another option for the cleaning apparatus 50, that can further comprise the indicia index 205 on the sidewall 110 exterior surface 113 for a fluid 250 volumetric amount in the interior 125, as best shown in FIG. 1. Again optionally for the cleaning apparatus 50, wherein the sidewall 110 can be constructed of a self illuminating material such as material that transmit and reflect light.

METHOD OF USE

Looking at FIGS. 5 and 6 in particular, a method for cleaning an article 175 using the cleaning apparatus 50 is disclosed, wherein the article 175 having the proximal end portion 180 and the opposing distal end portion 185 with the longwise axis 190 spanning therebetween on the article 175. Wherein the method for cleaning the article 175 includes the steps of firstly providing the cleaning apparatus 50 itself that includes the base 105, the surrounding sidewall 110 extending from the base 105, the sidewall 110 being about the longitudinal axis 111, the sidewall 110 having the interior surface 112 and the opposing exterior surface 113, the sidewall 110 terminating in the open aperture 120 having the scarfed outlet margin 115 in relation to the base 105, see FIGS. 1 to 4.

Wherein the scarfed outlet margin 115 structurally results in the sidewall 110 having the maximum extension distance 121 from the base 105 and the peripherally opposing 123 minimum extension distance 122 from the base 105 wherein the remainder of the outlet margin 115 has a varying extension distance from the base 105 that is in-between the minimum 122 and maximum 121 extension distances, with the sidewall 110 interior surface 112 and the base 105 defining the cleaning apparatus 50 interior 125, see in particular FIG. 1.

Wherein operationally, the scarfed margin 115 facilitates the interior 125 being filled to capacity with the liquid 250 while the longitudinal axis 111 forms the longitudinal axis 111 acute angle 124 with the surface 114, see FIG. 5. The cleaning apparatus 50 for an article 175 further providing the cleaning surface 130 that is movably engaged 131 to the base 105, the cleaning surface 130 including the plurality of flexible elements 132, each flexible element 132 having the proximal end portion 133 and the opposing distal end portion 134 with the element length axis 136 therebetween, each element length axis 136 is substantially parallel 137 to one another, wherein the plurality of proximal end portions 133 are affixed 138 to one another forming the substructure 143 and the plurality of distal end portions 134 have free independent movement 139 to one another in a cantilever manner, plus the the means 140 for imparting movement 135 to the substructure 143 to cause movement 135 at the plurality of flexible element 132 distal end portions 134 relative to the base 105 and surrounding sidewall 110, see in particular FIGS. 3 and 4.

Secondly, a step of filling the sidewall 110 interior 125 with the fluid 250 that can preferably be a lukewarm soapy water mix, as best shown in FIGS. 5 and 6.

Thirdly, a step of tilting the base 105 and sidewall 110 such that the scarfed margin 115 is substantially lateral or could be termed substantially parallel 255 to the surface 114, as best shown in FIG. 5.

Fourthly, a step of placing the article 175 distal end portion 185 to be immersed in the fluid 250, wherein the article 175 can be a pet animal leg, as shown in FIGS. 5 and 6.

Fifthly, a step of activating via the on/off switch 155 the means 140 to impart movement 135 to the substructure 143, see FIGS. 3 to 6.

Sixthly, a step of maintaining the means 140 imparted movement 135 for a selected period of time, again see FIGS. 3 to 6.

Seventh, a step of removing the article 175 distal end portion 185 from the interior 125.

Optionally, for the method for cleaning the article 175, wherein the sidewall 110 can further comprise the indicia index 205 on the sidewall 110 exterior surface 113 for the fluid 250 volumetric amount in the interior 125, wherein the second step of filling is further modified to fill the sidewall 110 interior 125 to a selected indicia index level to operationally have a desired fluid 250 level in the interior 125 with the article 175 distal end portion 185 immersed in the fluid 250, see FIGS. 5 and 6. The preferred fill level for the liquid 250 within the surrounding sidewall 110 is to be at least covering the brushes 141.

In looking at FIGS. 5 and 6, and looking at particular at the handle 150, the cleaning apparatus 50 is specifically designed for one hand operation by the user to allow the user's other hand to tend to the article (pet), as being more efficient given the animal's propensity to be uncomfortable with their paw being manipulated, thus the cleaning apparatus is angled at about forty-five degree to the surface that the pet is standing on and with the scarfed top outlet margin 115, the surrounding sidewall 110 will hold a full amount of soapy liquid 250 that has a top surface that is even with the scarfed outlet margin 115, allowing easier insertion and removal of the pet leg and paw from the surrounding sidewall. In addition to further enhance the user's one had operation on the handle 150, the scrub brushes 141 are selective moved 135 via the button 155 with the means 140 for imparting movement 135 to the brushes 141, such that the soaking the paw 185 in the soapy liquid 250 and moving 135 brush 141 cleaning are accomplished by the user merely holding the handle 150 alone with one hand of the cleaning apparatus 50.

CONCLUSION

Accordingly, the present invention of the cleaning apparatus for the article and method of use of the cleaning apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A cleaning apparatus for an article having a proximal end portion and an opposing distal end portion with a longwise axis spanning therebetween on the article, said cleaning apparatus comprising:
   (a) a base;
   (b) a surrounding sidewall extending from said base, said sidewall being about a longitudinal axis, said sidewall having an interior surface and an opposing exterior surface, said sidewall terminating in an open aperture having a scarfed outlet margin in relation to said base, said scarfed outlet margin structurally results in said sidewall having a maximum extension distance from said base and a peripherally opposing minimum extension distance from said base, wherein a remainder of said outlet margin has a varying extension distance from said base that is in-between said minimum and maximum extension distances, said sidewall interior surface and said base defining a cleaning apparatus interior, wherein operationally said scarfed margin facilitates said interior being filled to a selected capacity with a liquid while said longitudinal axis forms a longitudinal axis acute angle with a surface; and
   (c) a cleaning surface movably engaged to said base, said cleaning surface including a plurality of flexible elements, each said flexible element having a proximal end portion and an opposing distal end portion with an element length axis therebetween, each said element length axis are substantially parallel to one another wherein said plurality of proximal end portions are affixed to one another forming a substructure and said plurality of distal end portions have free independent movement to one another in a cantilever manner; and
   (d) a means for imparting movement to said substructure to cause movement at said plurality of flexible element distal end portions.

2. A cleaning apparatus according to claim 1 wherein said cleaning surface is constructed of a brush wherein said plurality of flexible element distal end portions are free bristle ends of said brush that positionally face said scarfed outlet margin and said substructure is positionally facing said base.

3. A cleaning apparatus according to claim 2 wherein said means for imparting movement is constructed of a motor wherein said movement is omnidirectional having movement in a X, or Y, or Z axes.

4. A cleaning apparatus according to claim 2 wherein said means for imparting movement is constructed of a motor wherein said movement is omnidirectional having movement in a X and a Y axes.

5. A cleaning apparatus according to claim 2 wherein said means for imparting movement is constructed of a motor wherein said movement is omnidirectional having movement about said sidewall longitudinal axis.

6. A cleaning apparatus according to claim 1 further comprising a handle disposed on said sidewall exterior surface wherein said handle is positioned at said sidewall minimum extension distance.

7. A cleaning apparatus according to claim 1 wherein said sidewall is constructed of transparent material.

8. A cleaning apparatus according to claim 7 further comprising an indicia index on said sidewall exterior surface for a fluid volumetric amount in said interior.

9. A cleaning apparatus according to claim 7 wherein said sidewall is constructed of a self illuminating material.

10. A cleaning apparatus according to claim 1 wherein said scarfed margin forms a scarfed plane, wherein said scarfed plane is at a plane acute angle with said sidewall longitudinal axis.

11. A cleaning apparatus according to claim 10 wherein said plane acute angle is about forty-five degrees.

12. A cleaning apparatus according to claim 1 further comprising a light disposed within said sidewall interior.

13. A cleaning apparatus according to claim 1 further comprising a temperature indictor disposed within said sidewall interior.

14. A method for cleaning an article using a cleaning apparatus, wherein the article having a proximal end portion and an opposing distal end portion with a longwise axis spanning therebetween on the article, said method for cleaning the article comprising the steps of:

(a) providing a cleaning apparatus that includes a base, a surrounding sidewall extending from said base, said sidewall being about a longitudinal axis, said sidewall having an interior surface and an opposing exterior surface, said sidewall terminating in an open aperture having a scarfed outlet margin in relation to said base, said scarfed outlet margin structurally results in said sidewall having a maximum extension distance from said base and a peripherally opposing minimum extension distance from said base wherein a remainder of said outlet margin has a varying extension distance from said base that is in-between said minimum and maximum extension distances, said sidewall interior surface and said base defining a cleaning apparatus interior, wherein operationally said scarfed margin facilitates said interior being filled to capacity with a liquid while said longitudinal axis forms a longitudinal axis acute angle with a surface, further providing a cleaning surface movably engaged to said base, said cleaning surface including a plurality of flexible elements, each said flexible element having a proximal end portion and an opposing distal end portion with an element length axis therebetween, each said element length axis are substantially parallel to one another wherein said plurality of proximal end portions are affixed to one another forming a substructure and said plurality of distal end portions have free independent movement to one another in a cantilever manner, and a means for imparting movement to said substructure to cause movement at said plurality of flexible element distal end portions;

(b) filling said sidewall interior with a fluid;

(c) tilting said base and sidewall such that said scarfed margin is substantially lateral;

(d) placing the article distal end portion to be immersed in the fluid;

(e) activating said means to impart movement to said substructure;

(f) maintaining said means impart movement for a selected period of time; and (g) removing the article distal end portion from said interior.

15. A method for cleaning an article according to claim 14 herein said sidewall further comprises an indicia index on said sidewall exterior surface for a fluid volumetric amount in said interior, wherein said step of filling is further modified to fill said sidewall interior to a selected indicia index to operationally have a desired fluid level in said interior with the article distal end portion immersed in the fluid.

* * * * *